(12) United States Patent
Abdulkhair et al.

(10) Patent No.: US 12,466,729 B1
(45) Date of Patent: Nov. 11, 2025

(54) NANOCOMPOSITE OF GRAPHITIC $C_3N_4$, $V_2O_5$, AND $MgAl_2O_4$ FOR HYDROGEN GENERATION

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Mohamed Khairy Omran, Riyadh (SA); Mohamed Nady Abd El-Hameed Ibrahim, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/071,723

(22) Filed: Mar. 5, 2025

(51) Int. Cl.
| | |
|---|---|
| C01B 3/06 | (2006.01) |
| B01J 21/00 | (2006.01) |
| B01J 21/10 | (2006.01) |
| B01J 23/22 | (2006.01) |
| B01J 35/45 | (2024.01) |
| B01J 35/61 | (2024.01) |
| B01J 35/63 | (2024.01) |

(Continued)

(52) U.S. Cl.
CPC ............. *C01B 3/065* (2013.01); *B01J 21/005* (2013.01); *B01J 21/10* (2013.01); *B01J 23/22* (2013.01); *B01J 35/45* (2024.01); *B01J 35/613* (2024.01); *B01J 35/633* (2024.01); *B01J 35/643* (2024.01); *B01J 35/647* (2024.01); *B82Y 30/00* (2013.01); *B01J 2235/15* (2024.01); *C01B 2203/1041* (2013.01); *C01B 2203/1205* (2013.01)

(58) Field of Classification Search
CPC ......... C01B 3/065; B01J 35/45; B01J 35/643; B01J 35/647; B01J 35/613; B01J 35/633; B01J 21/005; B01J 21/10; B01J 23/22; B82Y 30/00
See application file for complete search history.

(56) References Cited

U.S. PATENT DOCUMENTS

2017/0354962 A1    12/2017   D'Souza et al.

FOREIGN PATENT DOCUMENTS

| RU | 2 323 045 C1 | 4/2008 |
|---|---|---|
| WO | 2024/084512 A1 | 4/2024 |

OTHER PUBLICATIONS

S.V. Prabhakar Vattikuti, et.al., "Graphitic carbon nitride/Na2Ti3O7/V2O5 nanocomposite as a visible light active photocatalyst", Ceramics International, vol. 46, May 6, 2020, pp. 18287-18296.

(Continued)

*Primary Examiner* — James A Fiorito
(74) *Attorney, Agent, or Firm* — Oblon, McClelland, Maier & Neustadt, L.L.P.

(57) ABSTRACT

A method of hydrogen generation includes contacting sodium borohydride ($NaBH_4$) and water in the presence of a nanocomposite comprising graphitic $C_3N_4$, $V_2O_5$, and $MgAl_2O_4$ in a mass relationship to each other in a range of from 5 to 15:2 to 7:75 to 95, at a temperature in a range of from 10 to 80° C., thereby catalyzing the hydrogen generation at a hydrogen generation rate in a range of from 2000 to 5000 mL/(min·g).

20 Claims, 6 Drawing Sheets

(51) Int. Cl.
*B01J 35/64* (2024.01)
*B82Y 30/00* (2011.01)

(56) References Cited

OTHER PUBLICATIONS

Danil M. Shivtsov, et. al., "Hydrogen Production by N-heterocycle Dehydrogenation over Pd Supported on Aerogel-Prepared Mg—Al Oxides", Catalysts 2023, vol. 13, 334, Feb. 2, 2023, 19 pages.
Lei Han, et.al., "Fabrication of porous MgAl2O4 ceramics using V2O5 as sintering additive", Ceramics International, vol. 46, Issue 14, Jun. 4, 2020, pp. 22819-22825, 39 pages.

NANOCOMPOSITE OF GRAPHITIC $C_3N_4$, $V_2O_5$, AND $MgAl_2O_4$ FOR HYDROGEN GENERATION

BACKGROUND

The present disclosure is directed to nanocomposites, more particularly, to nanocomposites of g-$C_3N_4$@$V_2O_5$/$MgAl_2O_4$ as catalysts for the generation of $H_2$ via the hydrolysis of $NaBH_4$.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

In recent years, tremendous industrialization and population increases have led to a search for alternate energy sources to meet the expanding energy demand. Primarily, the depletion of non-renewable energy resources and environmental concerns compel societies to switch to clean, renewable energy sources soon. Although generating energy from the sun is cheap, the storage of this energy costs money because people have to rely on battery storage, which can be replaced repeatedly, is expensive, and is difficult to dispose of safely.

On the other hand, hydrogen energy is cleaner and has several advantages over battery systems: it's 100% clean, has extended life storage, and unlimited production and storage. Hydrogen energy has several advantages over batteries when saving energy and powering various applications. Here are some key benefits, including the fact that $H_2$ has a higher energy density than most batteries, meaning it can store more energy in a smaller volume, making it ideal for applications like transportation, where weight and space are critical. Refueling a hydrogen vehicle can take just a few minutes, similar to traditional gasoline vehicles, whereas charging batteries can take much longer.

$H_2$ fuel cells can provide longer ranges than battery electric vehicles, making them suitable for heavy-duty applications and long-distance travel. Further, they are lighter than the equivalent battery systems for large-scale applications, such as trucks or ships, which is crucial for efficiency and payload capacity. $H_2$ production can be scaled up from renewable sources (like electrolysis using solar or wind power), potentially leading to sustainable and large-scale energy storage solutions. Unlike batteries, which degrade over time and require replacement, hydrogen systems can maintain performance over a longer lifespan with proper maintenance. Also, $H_2$ can be used in various sectors beyond transportation, such as industrial processes, heating, and energy storage, providing versatility in energy solutions. Hydrogen can store excess renewable energy for long periods, helping to balance supply and demand in the energy grid. Further, hydrogen can offer a clean energy alternative when produced from renewable sources, emitting only water vapor when used in fuel cells, and can help stabilize the electrical grid by acting as a flexible energy storage solution, absorbing excess energy during peak production times.

Further research has been conducted in this regard, e.g., in Sust. Energy Techn. Assess. 2023, 55, 102905 and Resources, Cons. Recycl. 2020, 155, 104662, which are each incorporated by reference herein, but challenges remain.

While hydrogen energy has significant advantages, it is essential to consider the challenges, such as production costs, infrastructure, and energy conversion efficiency; however, its potential for a sustainable energy future is promising.

Accordingly, one object of the present disclosure is to provide an efficient method for hydrogen generation using a nanocomposite catalyst that may circumvent the drawbacks and limitations, such as high cost, high lead times, low efficiency, and poor environmental performance of methods and materials known in the art.

SUMMARY

In an exemplary embodiment, a method of hydrogen generation may include contacting (e.g., sodium) borohydride ($NaBH_4$) and water in the presence of a nanocomposite comprising graphitic $C_3N_4$, $V_2O_5$, and $MgAl_2O_4$ in a mass relationship to each other in a range of from 5 to 15:2 to 7:75 to 95, at a temperature in a range of from 10 to 80° C., thereby catalyzing the hydrogen generation at a hydrogen generation rate in a range of from 2000 to 5000 mL/(min·g).

The average pore distribution of the nanocomposite may be unimodal. The BET specific surface area of the nanocomposite may be in a range of from 25 to 75 $m^2/g$ (e.g., 43.3±5, 4, 3.33, 2.5, 2, 1.5, 1, 0.75, 0.67, 0.5, 0.33, 0.25, 0.125, 0.1, 0.05, or 0.01 $m^2/g$). The average pore diameter of the nanocomposite, according to BJH measurement method, may be in a range of from 1 to 10 nm (e.g., 5.66±1.5, 1, 0.75, 0.67, 0.5, 0.33, 0.25, 0.125, 0.1, 0.05, or 0.01 nm). The average pore volume of the nanocomposite, according to the BJH measurement method, may be in a range of from 0.01 to 0.5 $cm^3/g$ (e.g., 0.105±0.1, 0.05, 0.025, 0.01, 0.0075, 0.005, 0.0025, or 0.0001 $cm^3/g$).

The nanocomposite may have a (111) interplanar spacing in a range of from 0.220 to 0.300 nm, a (400) spinel interplanar spacing in a range of from 0.140 to 0.220 nm, a (220) interplanar spacing in a range of from 0.105 to 0.195 nm, and/or a (620) spinel interplanar spacing in a range of from 0.090 to 0.170, according to selected area diffraction.

The mass relationship of the nanocomposite may be in a range of from 9 to 11:4 to 6:84 to 86, wherein the nanocomposite has a (111) interplanar spacing of 0.260±2% nm, a (400) spinel interplanar spacing of 0.183±2% nm, a (220) interplanar spacing of 0.147±2% nm, and/or a (620) spinel interplanar spacing of 0.129±2% nm, according to selected area diffraction, wherein an XRD spectrum of the nanocomposite under Cu-filtered CuKα radiation (1.5418 Å) powered at 45 kV and 10 mA has 2θ peaks of an $MgAl_2O_4$ spinel phase at 18.6±1, 44.9±1, 56.1±1, 59.7±1, and/or 74.7±1°, an MgO cubic phase at 37.0±1, 62.6±1, 75.7±1, and/or 79.07±1°, an $Al_2O_3$ $V_2O_5$ phase at 26.6±1, 34.0±1, 43.1±1, and/or 64.9±1°, and/or g-$C_3N_4$-related diffractions at 67.2±1 and/or 79.0±1°. The $V_2O_5$ may be at least 95, 96, 97, 97.5, 98, 99, 99.1, 99.5, or 99.9% dissolved within the $MgAl_2O_4$ spinel phase and g-$C_3N_4$ lattice, as detected in the XRD spectrum.

The high hydrogen generation rate in contacting (e.g., sodium) borohydride ($NaBH_4$) and water in the presence of the nanocomposite may be in a range of from 3500 to 5000 mL/(min·g) [e.g., 3670±500, 400, 300, 250, 200, 150, 100, 90, 80, 75, 67, 60, 50, 40, 33, 25, 20, 15, 10, 5, 4, 3.33, 2.5, 2, 1.5, 1 mL/(min·g)]. The hydrogen generation rate in the contacting may be in a range of from 2 to 10-fold that without the nanocomposite.

The nanocomposite may include no more than 10 wt. % of $TiO_2$, relative to a total metal oxide weight.

The nanocomposite may include no more than 1 wt. % of AlN, relative to a total metal oxide weight.

The nanocomposite may include no more than 1 wt. % $SiO_2$, relative to a total metal oxide weight.

In some embodiments, relative to total carbon material weight, carbon materials in the nanocomposite comprise no more than 1 wt. % carbon nanotubes, no more than 1 wt. % graphene oxide, and no more than 1 wt. % carbon dots.

The nanocomposite no more than 1 wt. % AgBr, relative to a total metal oxide weight.

The nanocomposite may include no more than 1 wt. % Co, relative to total nanocomposite weight.

The nanocomposite may include no more than 1 wt. % elemental state metal, relative to total nanocomposite weight.

The nanocomposite may include no more than 1 wt. %, individually or combined, elemental state Co and/or Fe, relative to total nanocomposite weight.

The method may avoid or not comprise sonicating any starting materials, particularly not in a range of from 1 to 100 kHz.

The nanocomposite may include no more than 10 wt. % folic acid (or organic (di)acid), relative to total organic weight in the nanocomposite. The nanocomposite may include no more than 2.5 wt. % Mo, relative to the total weight of the nanocomposite.

The nanocomposite obtained may include no more than 1 wt. % carbonaceous material besides the graphitic carbon nitride. The carbon materials in the nanocomposite may include no nanotubes, relative to total nanocomposite weight.

The nanocomposite may include no more than 10 wt. % $VO_4$, relative to total vanadium-oxide weight. The nanocomposite may include no more than 1 wt. % V-doped ZnO, relative to total nanocomposite weight.

The nanocomposite may include no more than 10 wt. %, individually or together in any combination/in total, relative to total metal content, of any of Zn, Ce, Gd, La, Ba, Ti, Ca, Sr, Zr, Pb, Ni, Ag, Pt, Co, Cu, Mn, Cd, Ta, Nb, Pr, and/or Bi. The nanocomposite may include no more than 1 wt. %, individually or in any combination, relative to total carrier weight, of $LiCoO_2$, $SiO_2$, $TiO_2$, ZnO, and/or ZnS.

The graphitic $C_3N_4$ in the nanocomposite may consist essentially of sheet morphologies, i.e., such that no more than 5% of the hydrogen generation rate is lost, relative to the average rate of pure sheet morphology nanocomposites. The graphitic $C_3N_4$ in the nanocomposite may include no more than inevitable traces of boron, e.g., no more than 5, 4, 3, 2.5, 2, 1, 0.5, 0.1, 0.01, 0.001, 0.0001, or 0.00001 wt. %, relative to total nanocomposite weight of total carbonaceous matter weight in the nanocomposite, of boron.

The nanocomposite may have no more than 0.1 wt. % $Na_2Ti_3O_7$, relative to total nanocomposite weight.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
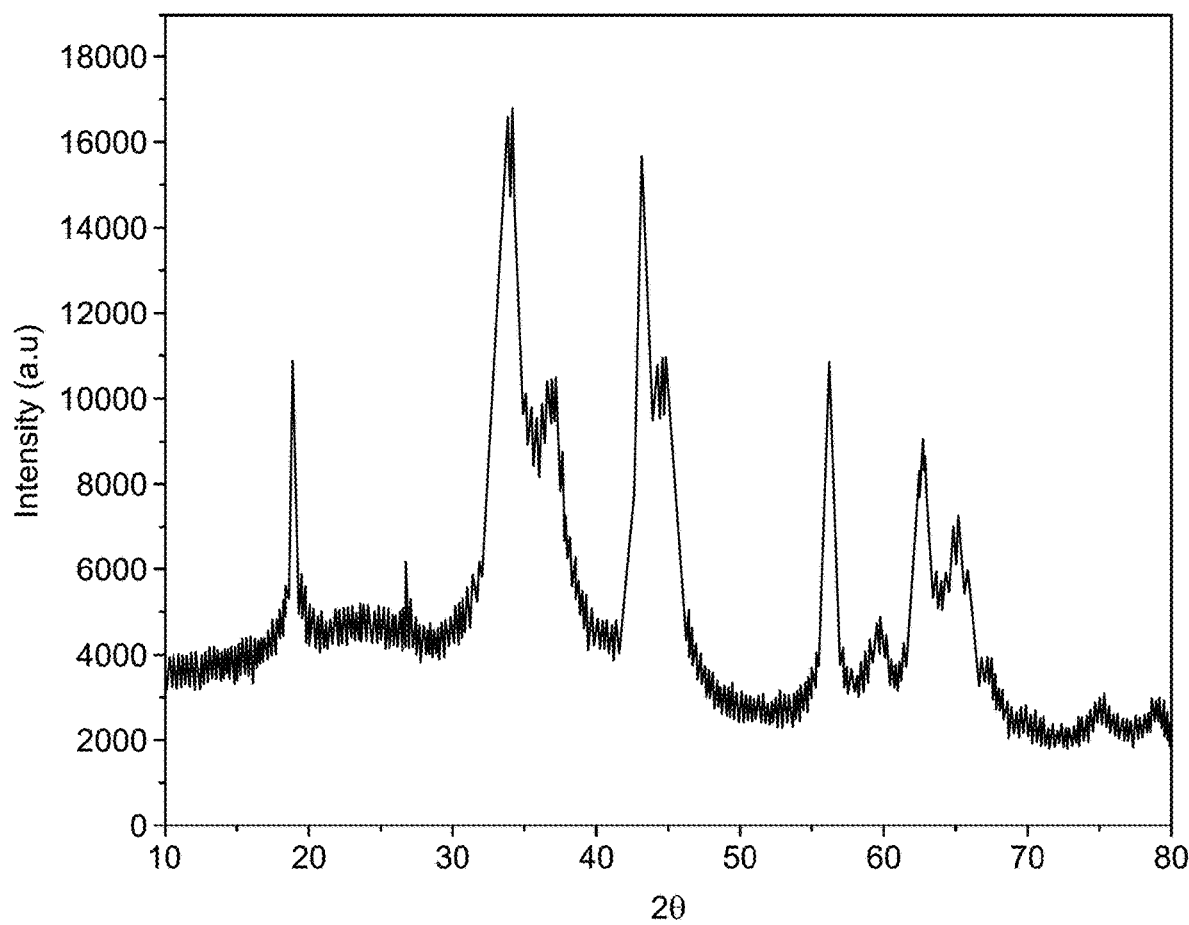
FIG. 1 illustrates X-ray diffraction (XRD) pattern of an inventive g-$C_3N_4$@$V_2O_5$/$MgAl_2O_4$ nanocomposite.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 500 nm within the scope of the present invention.

As used herein, the term 'nanocomposite' refers to a composite material that has at least one component with a grain size measured in nanometers.

As used herein, the term 'nanohybrid composite' refers to a material that combines nanomaterials (such as nanoparticles, nanotubes, or nanofibers) with another material, typically a polymer, metal, or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits unique properties that are superior to the individual materials alone.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a key parameter in characterizing the texture and permeability of porous materials, influencing their adsorption, filtration, or catalytic properties. The pore diameter may be often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram (cm$^3$/g) and is an important parameter in characterizing the porous structure of materials, such as adsorbents or catalysts.

As used herein, the term 'unimodal' refers to a distribution or pattern that has a single peak or mode. In the context of particle size or material properties, it indicates that the sample consists of particles or components that are primarily of one size or characteristic, rather than varying widely in size or composition.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}$C and $^{14}$C. Isotopes of oxygen include $^{16}$O, $^{17}$O, and $^{18}$O. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed toward a g-$C_3N_4$@$V_2O_5$/$MgAl_2O_4$ (10:5:85, wt. %) nanocomposite designed to function as a catalyst to enhance the hydrolysis of sodium borohydride ($NaBH_4$) for efficient production of hydrogen gas. The catalyst facilitates the safe and rapid release of hydrogen from a borohydride, such as $NaBH_4$, making it an efficient solution for clean hydrogen production. The present disclosure circumvents the drawbacks of prior art by addressing key limitations such as high catalyst costs, slow reaction rates, and environmental concerns. Traditional catalysts often require expensive materials and result in inefficient or slow hydrogen production. In contrast, the present disclosure uses a cost-effective catalyst that promotes faster hydrogen generation without relying on toxic or scarce materials. The simplicity of its preparation and its high catalytic activity also ensure scalability and practical applicability, without needing to apply potential or use electrodes, making it a more efficient and sustainable alternative to existing methods.

The nanocomposite may include graphitic $C_3N_4$, $V_2O_5$, and $MgAl_2O_4$. The mass relationship of graphitic $C_3N_4$, $V_2O_5$, and $MgAl_2O_4$ in the nanocomposite may be in a range of from 5 to 15:2 to 7:75 to 95, preferably 6 to 10:3 to 6:80 to 90, preferably 9 to 11:4 to 6:84 to 86, and more preferably 10:5:85, while tolerable variations of any of these values may be ±2.5, 2, 1.5, 1, 0.75, 0.5, 0.25, 0.1, 0.5, or 0.1. When each component of the nanocomposite is used in desired weight ratios, the nanocomposite can exhibit excellent performance in energy production.

The nanocomposite may contain g-$C_3N_4$ in an amount ranging from 5 to 15 wt. %, including 5 to 7 wt. %, 7 to 9 wt. %, 9 to 11 wt. %, 11 to 13 wt. %, and 13 to 15 wt. % based on the total weight of the nanocomposite. The nanocomposite may contain 10±2, 1.5, 1, 0.75, 0.5, 0.25, 0.2, or 0.1 wt. % of graphite-phase carbon nitride (g-$C_3N_4$).

The nanocomposite may contain $V_2O_5$ in an amount ranging from 2 to 7 wt. %, including 3 to 7 wt. %, 7 to 11 wt. %, 11 to 13 wt. %, 13 to 15 wt. %, and 15 to 17 wt. % based on the total weight of the nanocomposite. The nanocomposite may contain 5±2, 1.5, 1, 0.75, 0.5, 0.25, 0.2, or 0.1 wt. % of $V_2O_5$.

The nanocomposite may contain magnesium aluminum oxide ($MgAl_2O_4$) in an amount ranging from 75 to 95 wt. %, including 80 to 82 wt. %, 82 to 84 wt. %, 84 to 86 wt. %, 86 to 88 wt. %, and 88 to 90 wt. % based on the total weight of the nanocomposite. The nanocomposite may contain 85±5, 4, 3, 2.5, 2, 1.5, 1, 0.75, 0.5, 0.25, 0.2, or 0.1 wt. % of magnesium aluminum oxide ($MgAl_2O_4$).

The graphitic $C_3N_4$ in the nanocomposite may consist essentially of sheet morphologies, e.g., such that the BET surface area is not altered by more than 5% relative to pure sheet morphology nanocomposites (on average), although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures thereof are also possible.

The graphitic $C_3N_4$ in the nanocomposite may include no more than inevitable traces of boron, e.g., no more than 5, 4, 3, 2.5, 2, 1, 0.5, 0.1, 0.01, 0.001, 0.0001, or 0.00001 wt. %, relative to total nanocomposite weight, of boron. Limiting boron to trace amounts may ensure that the graphitic carbon nitride maintains its optimal performance in applications like photocatalysis, where the material's structural integrity and electron mobility are critical for efficiency.

The nanocomposite may be porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e., diameter) of less than 2 nm, e.g., in a range with an upper limit of 2, 1, 0.9, 0.75, 0.5, 0.25, 0.1, 0.05, or 0.01 nm, and/or a lower limit of 0.00001, 0.0001, 0.001, 0.01, 0.1, 0.25, 0.5, 0.75, or 1 nm. The term 'mesoporous' means the pores of the nanocomposite have an average pore width of 2 to 50 nm, though this may include subranges within this general range, e.g., a minimum diameter of 2, 3, 5, 10, 15, 20, 25, or 35 nm, and/or a maximum diameter of 50, 45, 40, 35, 30, 25, 20, 15, or 10 nm. The term 'macroporous' means the pores of nanocomposite have an average pore width larger than 50 nm, e.g., at least 55, 75, 100, 250, 500, 750, or 1000 nm. Pore size may be determined by methods including, but not limited to, gas adsorption (e.g., $N_2$ adsorption), mercury intrusion porosimetry, and imaging techniques such as scanning electron microscopy (SEM), and X-ray computed tomography (XRCT).

The Brunauer-Emmett-Teller (BET) surface area of the nanocomposite may be in a range of from 25 to 75 square meters per gram (m$^2$/g), including subranges of 30 to 70 m$^2$/g, 35 to 65 m$^2$/g, 40 to 60 m$^2$/g, 40 to 50 m$^2$/g, or 40 to 45 m$^2$/g. The surface area of the nanocomposite may be 43.3±5, 4, 3, 2.5, 2, 1.5, 1, 0.75, 0.5, 0.25, 0.2, or 0.1 m$^2$/g. The BET hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

The average pore distribution of the nanocomposite may include, but is not limited to, crystalline average pore distribution, bimodal, trimodal, multimodal, narrow, broad, and Gaussian. The average pore distribution of nanocomposite may be unimodal, indicating a single dominant pore size within the material. This unimodal distribution suggests that the nanocomposites possess a relatively narrow pore size range, resulting in more uniform pore structures and enhancing specific properties such as adsorption capacity, catalytic activity, or surface reactivity.

An average pore diameter of the nanocomposite, according to Barrett-Joyner-Halenda (BJH) measurement method, may be in a range of from 1 to 10 nm, preferably 2 to 9 nm, preferably 3 to 8 nm, preferably 4 to 7 nm, preferably 5 to 6 nm, preferably 5.66 nm. The nanocomposite may exhibit 5.66±1.5, 1, 0.75, 0.5, 0.25, 0.2, or 0.1 nm average pore diameter.

An average pore volume of the nanocomposite, according to the BJH measurement method, may be in a range of from 0.01 to 0.5 $cm^3/g$, including subranges such as 0.02 to 0.2 $cm^3/g$, 0.03 to 0.15 $cm^3/g$, 0.04 to 0.11 $cm^3/g$, 0.05 to 0.11 $cm^3/g$, 0.08 to 0.11 $cm^3/g$. The nanocomposite exhibits 0.105±0.1, 0.075, 0.05, 0.025, 0.01, 0.001, 0.0001, or 0.00001 $cm^3/g$.

The nanocomposite may have a (111) interplanar spacing in a range of from 0.220 to 0.300 nm, preferably 0.23 to 0.29 nm, preferably 0.24 to 0.28 nm, preferably 0.25 to 0.27 nm, preferably 0.26 nm, according to selected area diffraction. The nanocomposite may have a (400) spinel interplanar spacing in the range of 0.140 to 0.220 nm, preferably 0.15 to 0.21 nm, preferably 0.16 to 0.2 nm, preferably 0.17 to 0.19 nm, preferably 0.18, preferably 0.183 nm, according to selected area diffraction. The nanocomposite may have a (220) interplanar spacing in a range of from 0.105 to 0.195 nm, preferably 0.11 to 0.18 nm, preferably 0.12 to 0.17 nm, preferably 0.13 to 0.16 nm, preferably 0.14 to 0.15 nm, preferably 0.147 nm, according to selected area diffraction. The nanocomposite may have a (620) spinel interplanar spacing in a range of from 0.090 to 0.170, preferably 0.1 to 0.15 nm, preferably 0.1 to 0.13 nm, preferably 0.1 to 0.12 nm, preferably 0.129 nm, according to selected area diffraction.

The nanocomposite may have a (111) interplanar spacing of 0.260±2% nm, a (400) spinel interplanar spacing of 0.183±2% nm, a (220) interplanar spacing of 0.147±2% nm, and/or a (620) spinel interplanar spacing of 0.129±2% nm, according to selected area diffraction.

An XRD spectrum of the nanocomposite may show that the nanocomposite may be crystalline and exhibits a magnesium oxide (MgO) phase, a magnesium aluminum oxide ($MgAl_2O_4$) phase, an $Al_2O_3$ $V_2O_5$ phase, and a graphite-related diffractions. The $V_2O_5$ may be at least 95, 96, 97, 97.5, 98, 99, 99.1, 99.5, or 99.9% dissolved within the $MgAl_2O_4$ spinel phase and g-$C_3N_4$ lattice.

The MgO may exist in various phases like cubic, hexagonal, and puckered layers. The $Al_2O_3$ $V_2O_5$ may exist in zircon-type (tetragonal) or monazite-type (monoclinic) structures, or may include a combination thereof. The graphitic carbon nitride (g-$C_3N_4$) may exist in several crystalline phases, including α (alpha), β (beta), γ (gamma), and other less-common phases, or mixtures thereof.

$MgAl_2O_4$ may have a spinel phase. The spinel phase is a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$ ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed "normal." Conversely, when tetrahedral sites are occupied by half of the $B^{3+}$ and octahedral sites by the other half along with $A^{2+}$, the spinel phase is termed "inverse." The spinel phase with the chemical formula $MgAl_2O_4$ is a mineral type of this oxide family. $MgAl_2O_4$ has been widely used in various applications, such as in metallurgical, electrochemical, radio-technical, and chemical industrial fields owing to its high thermal stability (melting point at 2135° C., high hardness (16 gigapascal (GPa)), high mechanical resistance, high resistance against chemical attack, wide band gap energy, high electrical resistivity, relatively low thermal expansion coefficient ($9·10^{-6}$ 1/° C.) between 3° and 1400° C., low dielectric constant, low density (3.58 gram per cubic centimeters (g/$cm^3$)), high thermal shock resistance, hydrophobicity, and low surface acidity.

The XRD spectrum of the nanocomposite under Cu-filtered CuKα radiation (1.5418 Å) powered at 45 kilovolt (kV) and 10 milliampere (mA) may have 2θ peaks of an $MgAl_2O_4$ spinel phase at 18.6±1, 44.9±1, 56.1±1, 59.7±1, and/or 74.7±1°. The XRD spectrum of the nanocomposite under Cu-filtered CuKα radiation (1.5418 Å) powered at 45 kilovolt (kV) and 10 milliampere (mA) may have 2θ peaks of an MgO cubic phase at 37.0±1, 62.6±1, 75.7±1, and/or 79.07±1. The XRD spectrum of the nanocomposite under Cu-filtered CuKα radiation (1.5418 Å) powered at 45 kilovolt (kV) and 10 milliampere (mA) may have 2θ peaks of an $Al_2O_3$ $V_2O_5$ phase at 26.6±1, 34.0±1, 43.1±1, and/or 64.9±1°. The XRD spectrum of the nanocomposite under Cu-filtered CuKα radiation (1.5418 Å) powered at 45 kilovolt (kV) and 10 milliampere (mA) may have 2θ peaks of g-$C_3N_4$-related diffractions at 67.2±1 and/or 79.0±1°.

The nanocomposite may include no more than 10, 7.5, 5, 4, 3, 2, 1, 0.5, 0.1, 0.01, 0.001, 0.0001, or 0.00001 wt. %, preferably 9 wt. %, preferably 8 wt. %, preferably 7 wt. %, preferably 6 wt. %, preferably 5 wt. %, preferably 4 wt. %, preferably 3 wt. %, preferably 2 wt. %, preferably 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % $TiO_2$, relative to a total metal oxide weight.

The nanocomposite may include no more than 1, 0.5, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, relative to the total metal oxide weight.

The nanocomposite may include no more than 1, 0.5, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, relative to the total metal oxide weight.

The nanocomposite may include no more than 1, 0.5, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % AgBr, relative to the total metal oxide weight.

The nanocomposite may include no more than 10, 7.5, 5, 4, 3, 2, 1, 0.5, 0.1, 0.01, 0.001, 0.0001, or 0.00001 wt. %, preferably 9 wt. %, preferably 8 wt. %, preferably 7 wt. %, preferably 6 wt. %, preferably 5 wt. %, preferably 4 wt. %, preferably 3 wt. %, preferably 2 wt. %, preferably 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, of $VO_4$, relative to total vanadium-oxide weight.

The nanocomposite may include no more than 1, 0.5, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, of V-doped ZnO, relative to total nanocomposite weight.

The carbon materials in the nanocomposite may include no more than 1, 0.5, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of carbon nanotubes, relative to total carbon material weight in the nanocomposite.

The carbon materials in the nanocomposite may include no more than 1, 0.5, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of carbon dots, relative to total carbon material weight in the nanocomposite.

The carbon materials in the nanocomposite may include no more than 1, 0.5, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of graphene oxide, relative to total carbon material weight in the nanocomposite.

In some embodiments, carbon materials in the nanocomposite may include no more than 1, 0.5, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, individually or in any combination, carbon nanotubes, carbon dots, and/or graphene oxide, relative to total nanocomposite weight. The carbon materials in the nanocomposite may include no nanotubes or nanorods or graphene oxide relative to carbon material weight.

A low concentration of carbon material (carbon nanotubes, carbon dots, and graphene oxide) may contribute to maintaining the desired structural integrity and functional properties of the nanocomposite. The minimal amount of additional carbon material may prevent any significant interference with the performance of the nanocomposite, particularly in applications such as photocatalysis or energy storage, where the purity and specific properties are crucial.

The nanocomposite obtained may include no more than 1, 0.5, 0.1, 0.01, 0.001, 0.0001, or 0.00001 wt. % of carbonaceous material, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of carbonaceous material besides the graphitic carbon nitride.

The nanocomposite may include no more than 10, 7.5, 5, 4, 3, 2, 1, 0.5, 0.1, 0.01, 0.001, 0.0001, or 0.00001 wt. %, preferably 9 wt. %, preferably 8 wt. %, preferably 7 wt. %, preferably 6 wt. %, preferably 5 wt. %, preferably 4 wt. %, preferably 3 wt. %, preferably 2 wt. %, preferably 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, folic acid (or organic (di)acid generally) relative to total organic weight in the nanocomposite.

The nanocomposite may include no more than 1, 0.5, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, elemental state metal, relative to total nanocomposite weight.

The nanocomposite may include no more than 1, 0.5, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, elemental state Co, relative to total nanocomposite weight.

The nanocomposite may include no more than 1, 0.5, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, individually or in combination, elemental state Co and/or Fe, relative to total nanocomposite weight.

The nanocomposite may include no more than 2.5, 2, 1.5, 1, 0.75, 0.5, 0.1, 0.01, 0.001, 0.0001, or 0.00001 wt. %, preferably 2 wt. %, preferably 1.5 wt. %, preferably 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, Mo, relative to total nanocomposite weight.

The nanocomposite may include no more than 10, 7.5, 5, 4, 3, 2, 1, 0.5, 0.1, 0.01, 0.001, 0.0001, or 0.00001 wt. %, preferably 9 wt. %, preferably 8 wt. %, preferably 7 wt. %, preferably 6 wt. %, preferably 5 wt. %, preferably 4 wt. %, preferably 3 wt. %, preferably 2 wt. %, preferably 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, individually or in any combination, relative to the total metal content, of any of Zn, Ce, Gd, La, Ba, Ti, Ca, Sr, Zr, Pb, Ni, Ag, Pt, Co, Cu, Mn, Cd, Ta, Nb, Pr, and/or Bi. Excessive metal accumulation could negatively impact the nanocomposite's stability, reactivity, or selectivity. By limiting the metal content, the nanocomposite can maintain a high level of performance in its intended applications, potentially ensuring that the active sites of the carrier material remain unblocked or inhibited, thus enhancing its long-term durability, minimizing unwanted side reactions, and preserving its efficiency in processes like catalysis or energy conversion.

The nanocomposite may include no more than 1, 0.5, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, individually or in any combination/in total, relative to total carrier weight, of $LiCoO_2$, $SiO_2$, $TiO_2$, ZnO, and/or ZnS.

The nanocomposite may include no more than 0.1, 0.05, 0.025, 0.01, 0.001, 0.0001, or 0.00001 wt. %, preferably less than 0.09 wt. %, preferably less than 0.08 wt. %, preferably less than 0.07 wt. %, preferably less than 0.06 wt. %, preferably less than 0.05 wt. %, preferably less than 0.04 wt. %, preferably less than 0.03 wt. %, preferably less than 0.02 wt. %, preferably less than 0.01 wt. %, preferably less than 0.009 wt. %, preferably less than 0.006 wt. %, preferably less than 0.004 wt. %, preferably less than 0.001 wt. % of $Na_2Ti_3O_7$, relative to total nanocomposite weight.

A method of hydrogen generation using the nanocomposite may include contacting a borohydride, such as sodium borohydride ($NaBH_4$), and water in the presence of a catalyst comprising a nanocomposite including graphitic $C_3N_4$, $V_2O_5$, and $MgAl_2O_4$ in a mass relationship to each other in a range of from 5 to 15:2 to 7:75 to 95, at a temperature in a range of from 10 to 80° C., thereby catalyzing the hydrogen generation at a hydrogen generation rate in a range of from 2500 to 5000 L/(min·g), while tolerable variations of any of these values may be ±500, 400, 300, 250, 200, 150, 100, 75, 50, 25, 15, 10, 7.5, 5, 2.5, or 1 L/(min·g).

The method of contacting (e.g., sodium) borohydride with the nanocomposite does not include sonicating any starting materials, graphitic $C_3N_4$, $V_2O_5$, and $MgAl_2O_4$, particularly note in a range of from 1 to 100 kHz.

The method of contacting (e.g., sodium) borohydride with the nanocomposite may be performed at a temperature range of 20 to 70° C., preferably 25 to 65° C., preferably 30 to 60° C., preferably 35 to 55° C., preferably 40 to 50° C., preferably 40 to 45° C., more preferably at about 40° C. for a period of 1 to 60 minutes, preferably 5 to 10 minutes.

The borohydride salts may be lithium borohydride, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper(II) borohydride, thallium borohydride, gold borohydride, silver borohydride, rhodium borohydride, palladium borohydride, antimony borohydride, and/or combinations thereof may be used additionally or alternatively.

The hydrogen may be generated at a hydrogen generation rate ranging from 3500 to 5000 mL/min per gram, with specific intervals of 3550 to 4700 mL/min per gram, 3600 to 4500 mL/min per gram, 3650 to 4400 mL/min per gram, 3650 to 4200 mL/min per gram, 3650 to 4000 mL/min per gram of the nanocomposite. The hydrogen may be generated at a hydrogen generation rate of 3670 mL/min per gram of the nanocomposite.

The contacting the (e.g., sodium) borohydride with water in the presence of the nanocomposite may generate 2 to 10-fold more hydrogen in comparison to contacting the sodium borohydride with water in the absence of the nanocomposite after 5 minutes.

The following examples are provided solely for illustration and are not to be construed as limitations of the present disclosure, as many variations thereof are possible without departing from the spirit and scope of the present disclosure.

EXAMPLES

The following examples demonstrate a nanocomposite of graphitic-$C_3N_4$, $MnO_2$, and $MgAl_2O_4$ (g-$C_3N_4$@$MnO_2$/$MgAl_2O_4$). The examples are provided solely for illustration and are not to be construed as limitations of the present disclosure, as many variations thereof are possible without departing from the spirit and scope of the present disclosure.

Example 1: Fabricating the g-$C_3N_4$@$V_2O_5$/$MgAl_2O_4$ (10:5:85, wt. %) Nanocomposite Magnesium nitrate and aluminum nitrate were added together in one beaker with ammonium metavanadate amount proper (here, stoichiometric) to produce a 10% $V_2O_5$@$MgAl_2O_4$. About 10 g of dextrose as fuel was added to the beaker, followed by 30 mL of distilled water. The beaker was heated till a clear solution was obtained, then heated further till dryness. The product was ground in a mortar, transferred to a 150 mL porcelain dish, and calcined at 700° C. for 3.0 hours. Then after, the 10% $V_2O_5$@$MgAl_2O_4$ product was cooled down to room temperature and weighed, then ground with urea amount suitable (here, 2 g urea to 20 g of the 10% $V_2O_5$/$MgAl_2O_4$ product, but depending upon the reaction conditions, this may be 5, 10, 15, 20, 25, 33, 50, 100, 150, 250, 500, or 1000 parts by weight of urea to 100 parts by weight of 10% $V_2O_5$/$MgAl_2O_4$, and optionally no more than 100,000, 50,000, 25,000, 10,000, 5,000, 1,000, 750, 500, 400, 333, 250, 125, 100, 75, 50, 25, 20, 15, or 10 parts by weight urea to 100 parts) to produce g-$C_3N_4$@$V_2O_5$/$MgAl_2O_4$ (10:5:85, wt. %) nanohybrid. The quadruple mixture was returned and heated to 600° C. for 40.0 min in a covered porcelain crucible and cooled to room temperature; then after, the g-$C_3N_4$@$V_2O_5$/$MgAl_2O_4$ (10:5:85, wt. %) nanohybrid was collected.

Results

Figure 2A:
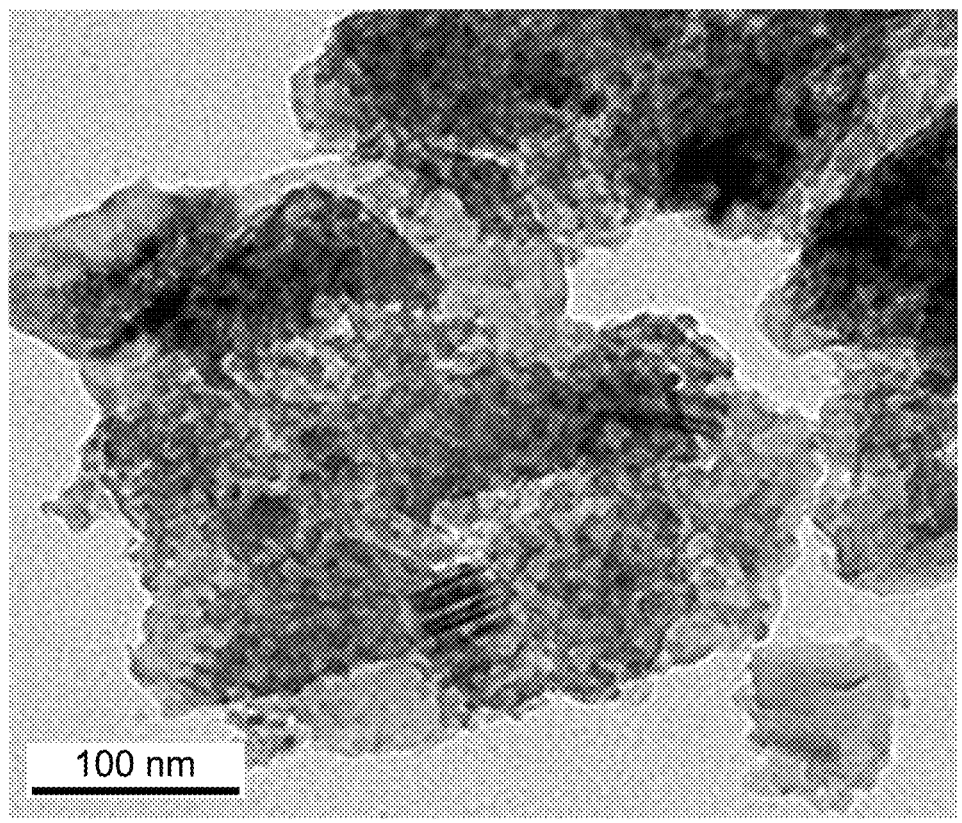
FIG. 2A and FIG. 2F show transmission electron microscope (TEM) of an inventive g-$C_3N_4$@$V_2O_5$/$MgAl_2O_4$ nanocomposite, at different magnifications.
Figure 2B:
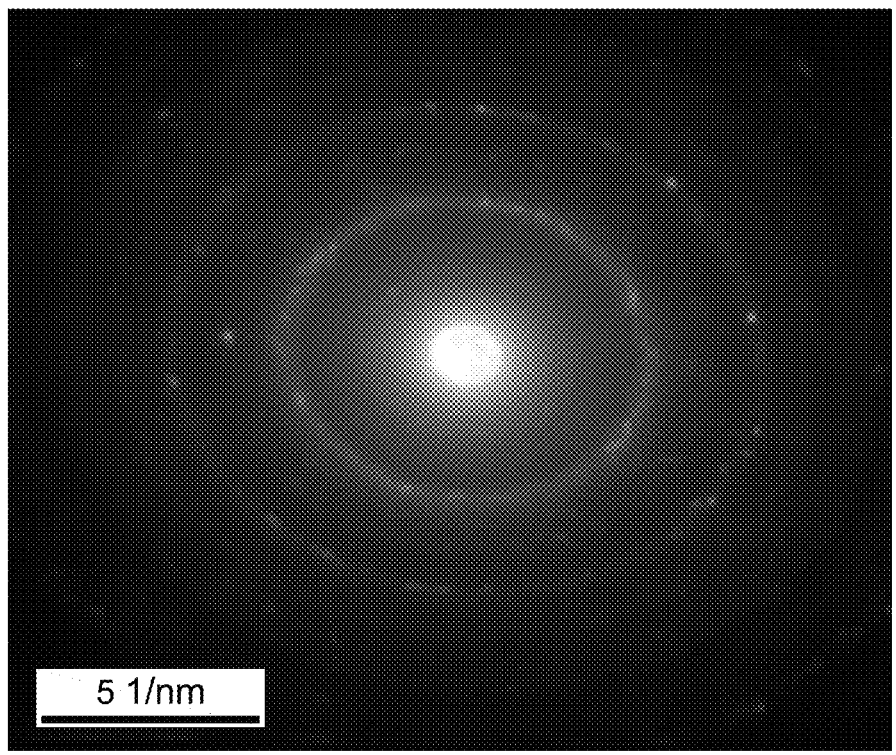
FIG. 2B shows a selected area electron diffraction (SAED) of an inventive g-$C_3N_4$@$V_2O_5$/$MgAl_2O_4$ nanocomposite.
Figure 2C:
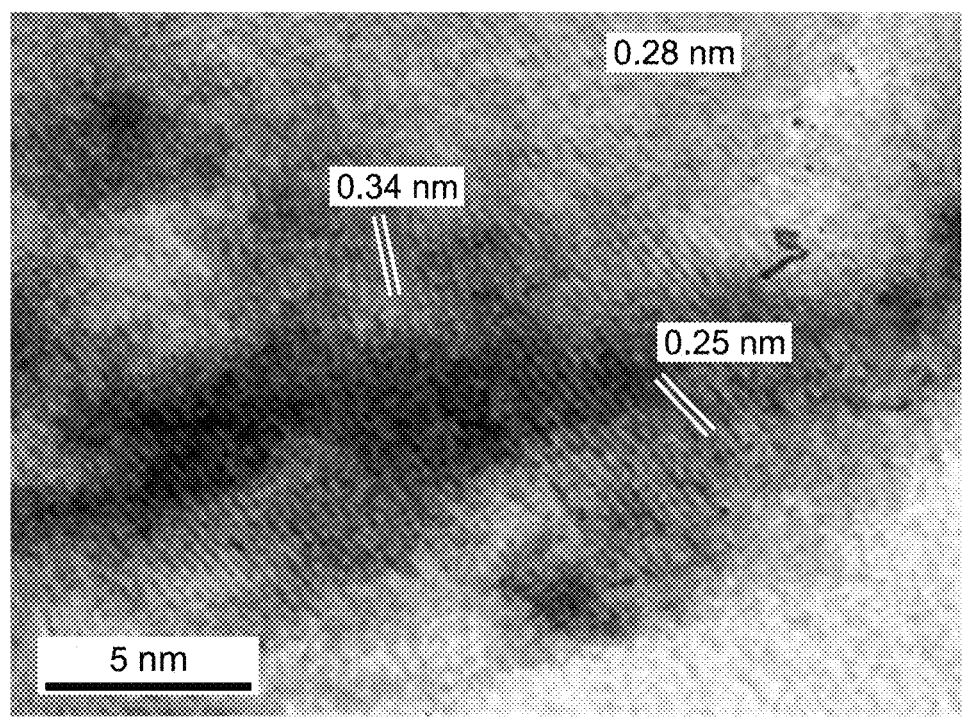
FIG. 2C shows a high-resolution transmission electron microscope (HRTEM) of an inventive g-$C_3N_4$@$V_2O_5$/$MgAl_2O_4$ nanocomposite.
Figure 2D:
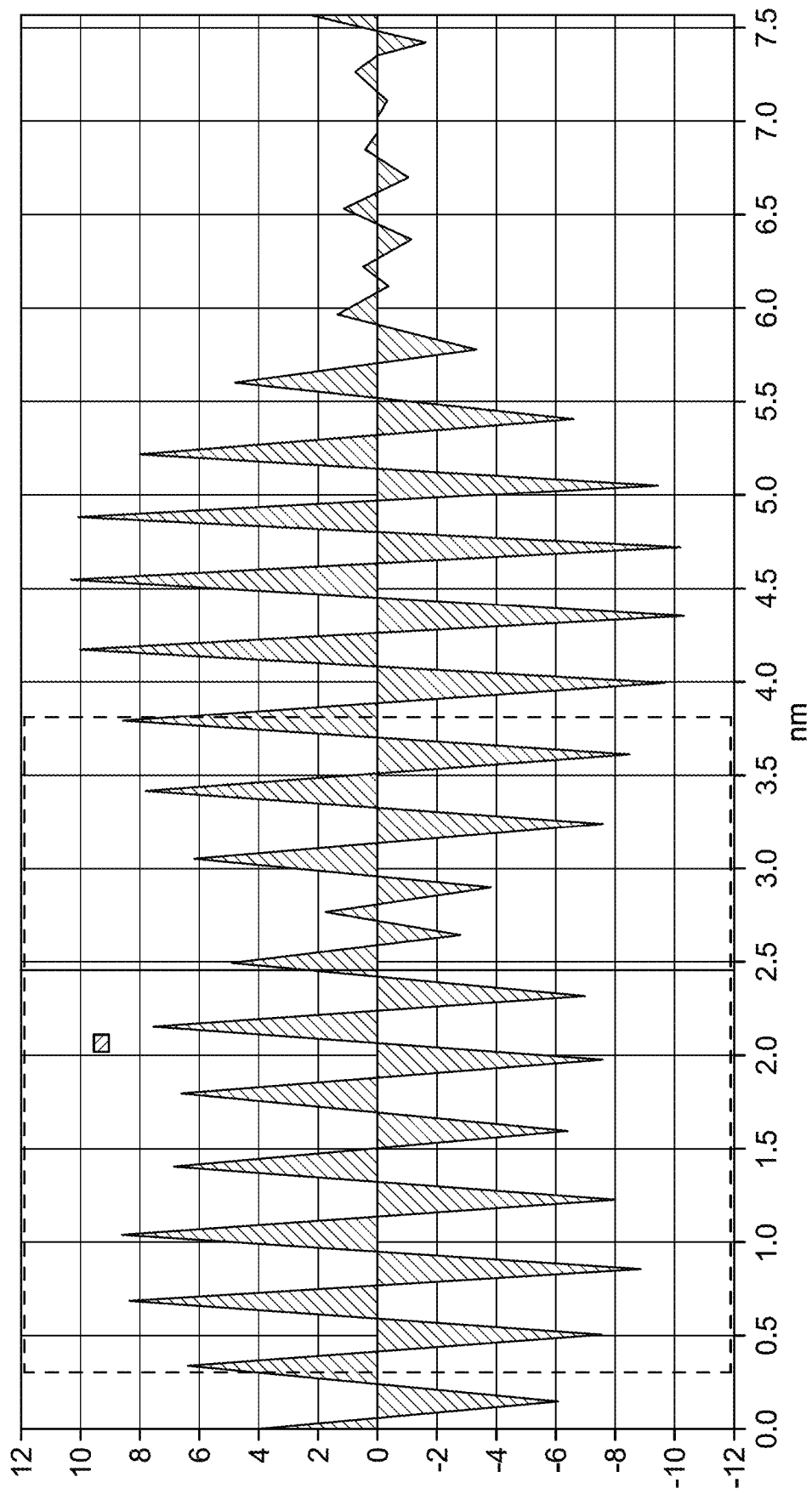
FIG. 2D shows Fast Fourier Transform (FFT) of an inventive g-$C_3N_4$@$V_2O_5$/$MgAl_2O_4$ nanocomposite.
Figure 2E:
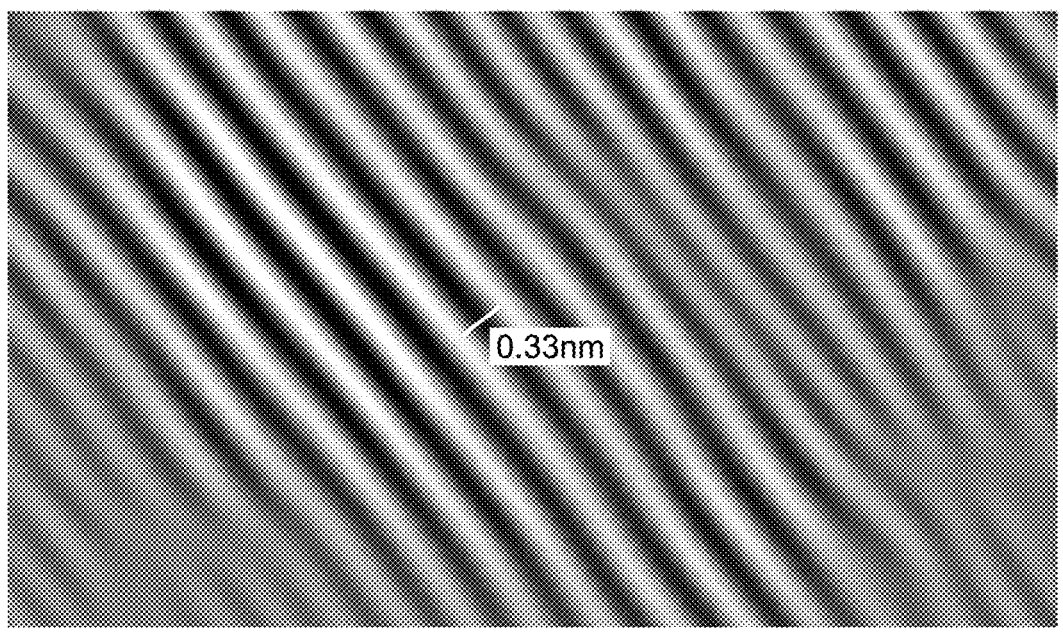
FIG. 2E shows Inverse Fast Fourier Transform (IFFT) patterns of an inventive g-$C_3N_4$@$V_2O_5$/$MgAl_2O_4$ nanocomposite.
Figure 2F:
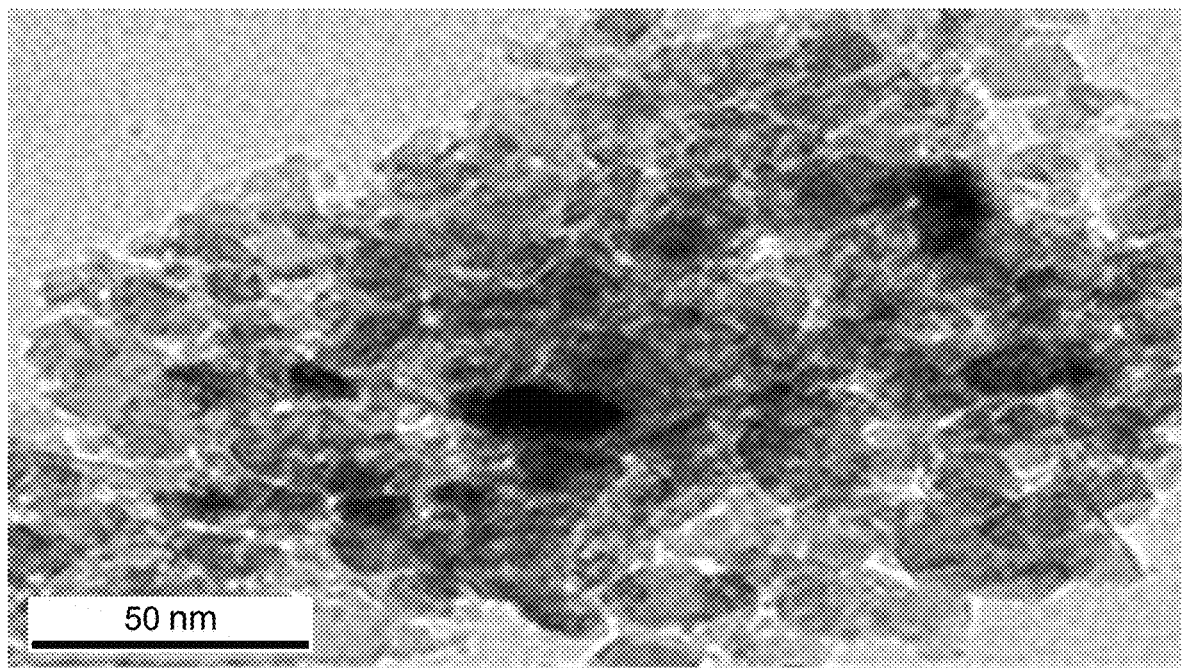

The crystallinity and phases identification present in the $V_2O_5$/$MgAl_2O_4$/g-$C_3N_4$ catalyst was analyzed by XRD, and the results are given in FIG. 1. The intense peaks and high-intensity values indicate that the powder is highly crystalline in nature. In addition, the broad peak demonstrates the small particle size of the prepared catalyst. When the diffraction patterns are examined using the Standard COD cards, the phases $V_2O_5$, MgO, $MgAl_2O_4$, and g-$C_3N_4$ are found. Diffraction that presented at 2θ values of 18.6, 44.9, 56.1, 59.7, and 74.7° were successfully indexed the $MgAl_2O_4$ spinel phase (COD No. 9002136). These diffractions are, respectively, assigned to (111), (400), (422), (511), and (620) plans. At 2θ values of 37.0, 62.6, 75.7, and 79.07°, the cubic phase of MgO (PDF card, No. 1011118) was detected. These diffractions were respectively coming from (111), (220), (311), and (222) plans. The presence of MgO together with the $MgAl_2O_4$ spinel phase was also previously reported. Diffractions at 2θ values of 26.6, 34.0, 43.1, and 64.9° are corresponding to the $V_2O_5$(COD No. 00-4124511). The appearance of weak diffraction of $V_2O_5$ indicates the complete dissolution of the $V_2O_5$ within the whole lattices of both spinel and g-$C_3N_4$. The diffractions related to g-$C_3N_4$ were observed at 67.2 and 79.0° (COD No. 1534042). No other phases were detected, indicating the successful fabrication of $V_2O_5$/$MgAl_2O_4$/g-$C_3N_4$ TEM images of g-$C_3N_4$@$V_2O_5$/$MgAl_2O_4$ nanocomposite were presented in FIG. 2. The TEM images showed that well dispersion of homogeneous spherical metal oxide nanoparticles with size 9.4 nm on two-dimensional porous structure constructed with curled and wrinkled nanosheets and platelets of the g-$C_3N_4$ (FIG. 2A and FIG. 2F). The corresponding SAED pattern reveals diffraction spots with an interplanar spacing of 0.260 nm, 0.183 nm, 0.147, and 0.129 nm due to (111, $V_2O_5$), (400, spinel), (220, MgO) and (620, spinel) diffraction planes (FIG. 2B). The corresponding HRTEM of the composite shows a plane spacing of 0.34 nm related to the (002) of CN, where 0.28 nm related to (220), a plane of spinel, and 0.263 nm related to (111) plane of $V_2O_5$, characterizing the heterostructure formation (FIG. 2C). The FFT and IFFT measurements show a d value of 0.33 nm given to g-$C_3N_4$@$V_2O_5$/$MgAl_2O_4$ nanocomposite, signifying the lattice spacing of (002), indicating the development of g-$C_3N_4$ structure (FIG. 2D and FIG. 2E).

Figure 3:
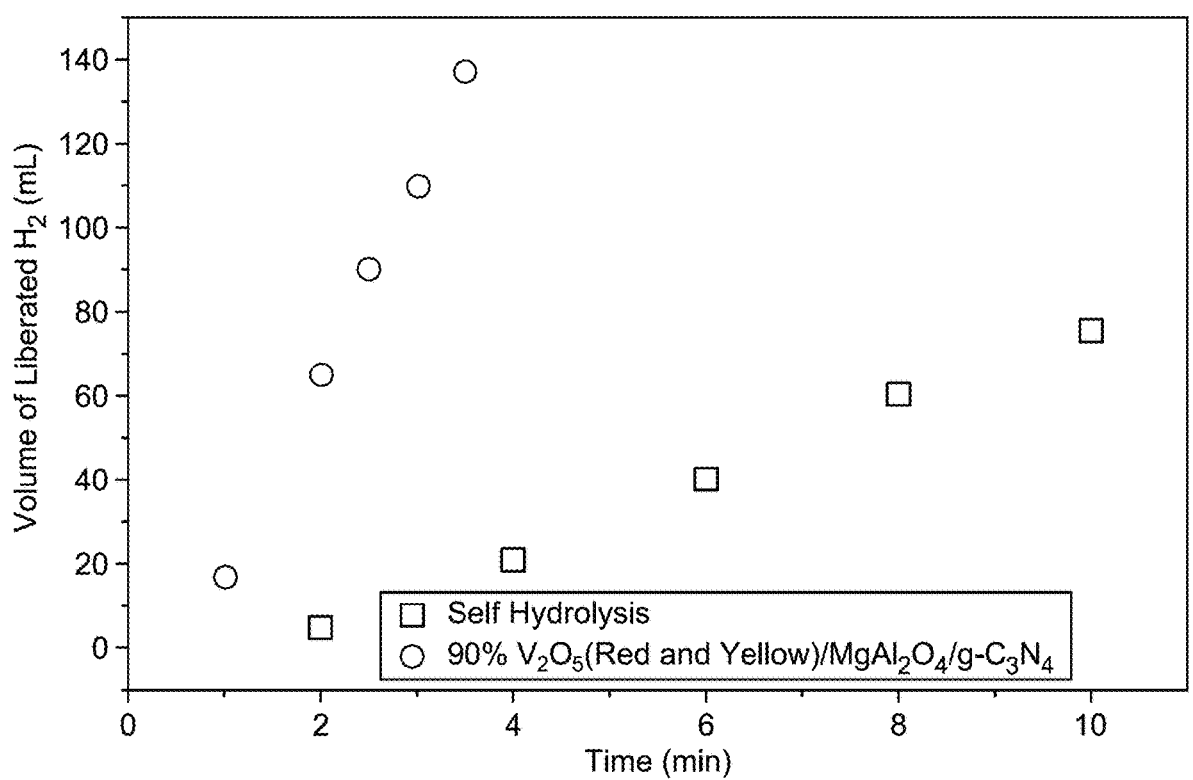
FIG. 3 is a bar graph showing the variation of liberated $H_2$ with reaction time over an inventive g-$C_3N_4$@$V_2O_5$/$MgAl_2O_4$ (10:5:85, wt. %) nanocomposite at a reaction temperature of 40° C.

To summarize, the present disclosure is directed to the fabrication of g-$C_3N_4$@$V_2O_5$/$MgAl_2O_4$ as a catalyst with a high hydrogen generation rate (HGR) that can hydrolyze sodium borohydride into pure, clean hydrogen ($H_2$) in a matter of minutes. It was made with inexpensive materials and was easily manufactured. A low-weight, stable, and safe hydrogen storage material with a high hydrogen storage capacity of 10.8 weight percent is sodium borohydride ($NaBH_4$). The results of hydrolysis of $NaBH_4$ with and without catalyst at a reaction temperature of 40° C. are shown in FIG. 3. The catalytic action of the nanocomposite was clearly observed where its performance exhibited catalytic activity higher than the self-hydrolysis process. Results also indicate that this catalyst offers an HGR of 3670 mL/(min·g) at a temperature of 40° C.

The catalysis using inventive nanocomposites may increase the volume of liberated $H_2$ (mL/min) by a factor in a range of from 2 to 50, e.g., at least 2, 3, 4, 5, 6, 7, 8, 9, or 10 and/or up to 50, 45, 40, 35, 33, 30, 25, 22.5, 20, 17.5, 15, 12.5, 12, 11, 10, 9, or 8-fold, relative to self-hydrolysis of the borohydride with water.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of hydrogen generation, the method comprising:
    contacting sodium borohydride and water in the presence of a catalyst comprising a nanocomposite comprising graphitic $C_3N_4$, $V_2O_5$, and $MgAl_2O_4$ in a mass relationship to each other in a range of from 5 to 15:2 to 7:75 to 95, at a temperature in a range of from 10 to 80° C., thereby catalyzing the hydrogen generation at a hydrogen generation rate in a range of from 2500 to 5000 mL/(min·g).

2. The method of claim 1, wherein the average pore distribution of the nanocomposite is unimodal, and
    wherein a BET specific surface area of the nanocomposite is in a range of from 25 to 75 m²/g, and/or
    wherein an average pore diameter of the nanocomposite, according to BJH measurement method, is in a range of from 1 to 10 nm, and/or
    wherein an average pore volume of the nanocomposite, according to the BJH measurement method, is in a range of from 0.01 to 0.5 cm³/g.

3. The method of claim 1, wherein the nanocomposite has a (111) interplanar spacing in a range of from 0.220 to 0.300 nm, a (400) spinel interplanar spacing in a range of from 0.140 to 0.220 nm, a (220) interplanar spacing in a range of from 0.105 to 0.195 nm, and a (620) spinel interplanar spacing in a range of from 0.090 to 0.170, according to selected area diffraction.

4. The method of claim 1, wherein the mass relationship of the nanocomposite is in a range of from 9 to 11:4 to 6:84 to 86,
    wherein the nanocomposite has a (111) interplanar spacing of 0.260±2% nm, a (400) spinel interplanar spacing of 0.183±2% nm, a (220) interplanar spacing of 0.147±2% nm, and a (620) spinel interplanar spacing of 0.129±2% nm, according to selected area diffraction,
    wherein an XRD spectrum of the nanocomposite under Cu-filtered CuKα radiation (1.5418 Å) powered at 45 kV and 10 mA has 2θ peaks of an MgAl$_2$O$_4$ spinel phase at 18.6±1, 44.9±1, 56.1±1, 59.7±1, and 74.7±1°,
an MgO cubic phase at 37.0±1, 62.6±1, 75.7±1, and 79.07±1°,
an Al$_2$O$_3$ V$_2$O$_5$ phase at 26.6±1, 34.0±1, 43.1±1, and 64.9±1°, and
g-C$_3$N$_4$-related diffractions at 67.2±1 and 79.0±1°, and
wherein the V$_2$O$_5$ is at least 95% dissolved within the MgAl$_2$O$_4$ spinel phase and g-C$_3$N$_4$ lattice, as detected in the XRD spectrum.

5. The method of claim 1, wherein the hydrogen generation rate in the contacting is in a range of from 3500 to 5000 mL/(min·g), and
wherein the hydrogen generation rate in the contacting is in a range of from 2 to 10-fold that without the nanocomposite.

6. The method of claim 1, wherein the nanocomposite comprises no more than 10 wt. % of TiO$_2$, relative to a total metal oxide weight.

7. The method of claim 1, wherein the nanocomposite comprises no more than 1 wt. % of AlN, relative to a total metal oxide weight.

8. The method of claim 1, wherein the nanocomposite comprises no more than 1 wt. % SiO$_2$, relative to a total metal oxide weight.

9. The method of claim 1, wherein, relative to total carbon material weight, carbon materials in the nanocomposite comprise
no more than 1 wt. % carbon nanotubes,
no more than 1 wt. % graphene oxide, and
no more than 1 wt. % carbon dots.

10. The method of claim 1, wherein the nanocomposite comprises no more than 1 wt. % AgBr, relative to a total metal oxide weight.

11. The method of claim 1, wherein the nanocomposite comprises no more than 1 wt. % Co, relative to total nanocomposite weight.

12. The method of claim 1, wherein the nanocomposite comprises no more than 1 wt. % elemental state metal, relative to total nanocomposite weight.

13. The method of claim 1, wherein the nanocomposite comprises no more than 1 wt. %, individually, elemental state Co and Fe, relative to total nanocomposite weight.

14. The method of claim 1, which does not comprise sonicating any starting materials in a range of from 1 to 100 KHz.

15. The method of claim 1, wherein the nanocomposite comprises no more than 10 wt. % folic acid, relative to total organic weight in the nanocomposite, and
wherein the nanocomposite comprises no more than 2.5 wt. % Mo, relative to total nanocomposite weight.

16. The method of claim 1, wherein the nanocomposite obtained comprises no more than 1 wt. % carbonaceous material besides the graphitic carbon nitride, and
wherein carbon materials in the nanocomposite comprise no nanotubes, relative to total nanocomposite weight.

17. The method of claim 1, wherein the nanocomposite comprises no more than 10 wt. % VO$_4$, relative to total vanadium-oxide weight, and
wherein the nanocomposite comprises no more than 1 wt. % V-doped ZnO, relative to total nanocomposite weight.

18. The method of claim 1, wherein the nanocomposite comprises no more than 10 wt. %, individually, relative to total metal content, of any of Zn, Ce, Gd, La, Ba, Ti, Ca, Sr, Zr, Pb, Ni, Ag, Pt, Co, Cu, Mn, Cd, Ta, Nb, Pr, and Bi, and
wherein the nanocomposite comprises no more than 1 wt. %, individually, relative to total carrier weight, of LiCoO$_2$, SiO$_2$, TiO$_2$, ZnO, and ZnS.

19. The method of claim 1, wherein the graphitic C$_3$N$_4$ in the nanocomposite consists essentially of sheet morphologies, and/or
wherein the graphitic C$_3$N$_4$ in the nanocomposite comprises no more than inevitable traces of boron.

20. The method of claim 1, wherein the nanocomposite has no more than 0.1 wt. % Na$_2$Ti$_3$O$_7$, relative to total nanocomposite weight.

* * * * *